M. C. ROSENFELD & C. O. LUND.
HOSE RACK.
APPLICATION FILED JAN. 22, 1914.

1,203,412.

Patented Oct. 31, 1916.
2 SHEETS—SHEET 1.

WITNESSES:
R. L. Bruck
H. B. McGill.

INVENTORS,
Mortimer C. Rosenfeld
Carl O. Lund
BY Hull Smith
ATTYS.

M. C. ROSENFELD & C. O. LUND.
HOSE RACK.
APPLICATION FILED JAN. 22, 1914.

1,203,412.

Patented Oct. 31, 1916.
2 SHEETS—SHEET 2.

WITNESSES.
R. L. Bruck.
H. B. McGill.

INVENTORS
Mortimer C. Rosenfeld and
Carl O. Lund
By Hull & Smith
ATTYS.

UNITED STATES PATENT OFFICE.

MORTIMER C. ROSENFELD, OF CLEVELAND, OHIO, AND CARL O. LUND, OF BROOKLYN, NEW YORK.

HOSE-RACK.

1,203,412.  Specification of Letters Patent.  Patented Oct. 31, 1916.

Application filed January 22, 1914. Serial No. 813,649.

*To all whom it may concern:*

Be it known that we (1) MORTIMER C. ROSENFELD and (2) CARL O. LUND, residing at (1) Cleveland and (2) Brooklyn, in the counties of (1) Cuyahoga and (2) Kings, and States of (1) Ohio and (2) New York, have invented a certain new and useful Improvement in Hose-Racks, of which the following is a full, clear, and exact description, reference being had to the accompanying drawings.

This invention relates generally to improvements in hose racks, and especially to an improved rack for supporting fire hose; and it has for its object to provide a device of this character which will support the hose in a manner that will permit of a quick and easy removal of the hose therefrom when occasion requires.

More specifically stated, our invention provides a hose rack whereon the hose may be supported in successive folds and which, when the free end of the hose is given a jerk, will collapse and drop the hose, the rack being so constructed as to be free from the danger of any of its parts sticking or refusing to operate.

More broadly stated, our invention may be defined as consisting of the combinations of elements set forth in the annexed claims and illustrated in the accompanying drawings forming part hereof, wherein—

Figure 1:
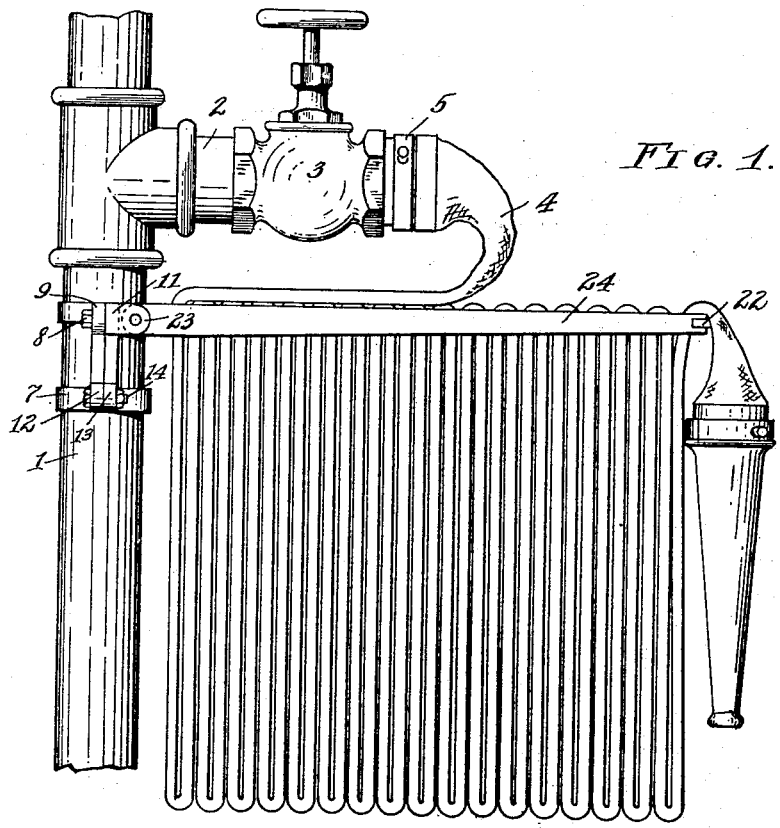
Figure 2:
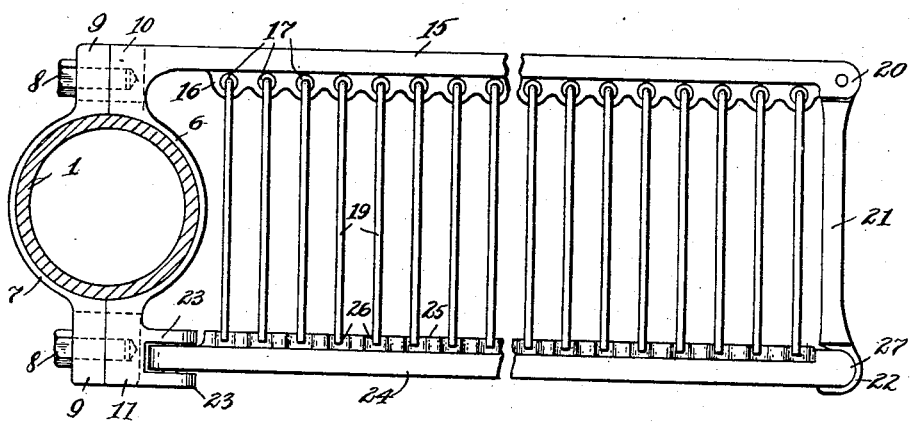
Figure 3:
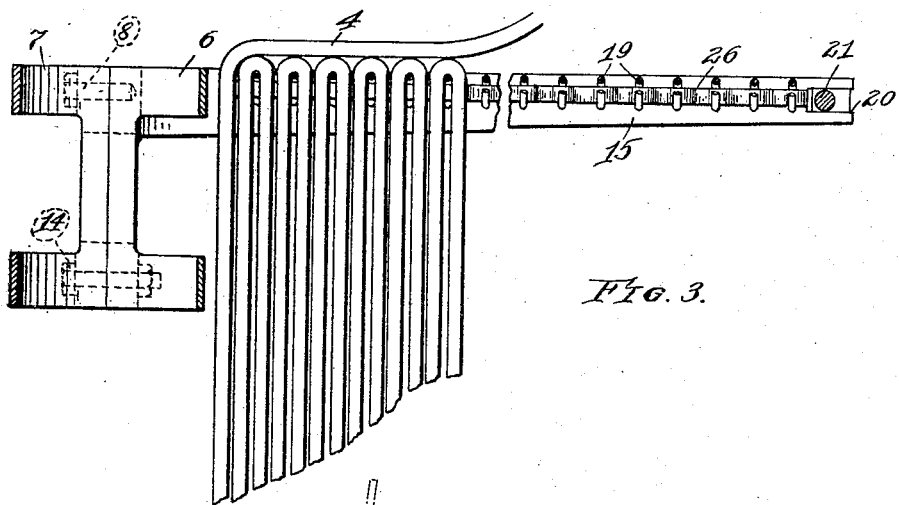
Figure 4:
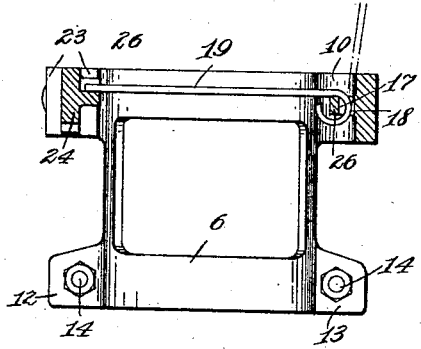
Figure 5:
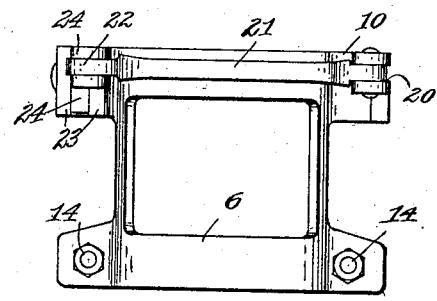
Figure 6:
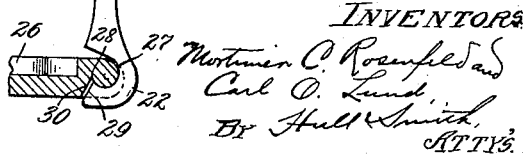

Figure 1 represents a side elevation of our improved hose rack applied to the stand pipe of a water system, and supporting a hose; Fig. 2 is a sectional view through the stand pipe, showing the rack in plan and the hose removed therefrom in order to more clearly illustrate the structural details of the rack, said figure, with the remaining figures, being on a somewhat larger scale than Fig. 1; Fig. 3 is a vertical longitudinal section through the rack; Fig. 4 is a vertical transverse section thereof; Fig. 5 is an end elevation of the rack; Fig. 6 is a horizontal section through the forward end of the rack; and Fig. 7 illustrates the hose rack rotatably supported by a stand pipe.

Taking up a detailed description of the invention by the use of reference characters, 1 represents the stand pipe of a water system wherewith buildings are usually equipped, the same having a branch 2 which is provided with a valve 3, and to the outer end of which is connected a fire hose 4 by a union 5. Clamped to the stand pipe 1 beneath the branch 2 is the hose rack which will now be described.

A semi-cylindrical frame 6 and a correspondingly shaped clip 7 are clamped about the stand pipe 1, the upper ends of the frame 6 and the clip 7 being secured together by a pair of cap screws 8 which pass through the ears 9 of the clip 7 and are threaded into the portions 10 and 11 of the frame. At their lower ends, the frame 6 and the clip 7 are provided with ears 12 and 13, respectively, which are secured together by bolts 14.

Figure 7:
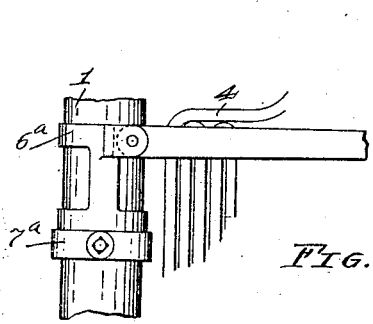

In Figs. 1 and 2 we have illustrated the rack as being clamped to the stand pipe, although it is obvious that the same might be provided with a cylindrical supporting member $6^a$, as shown in Fig. 7, which could be slipped over the end of the stand pipe during the assembling of the pipes of the water system, and if such a cylindrical member were supported, in turn, by a collar $7^a$ that is fastened to the stand pipe, the rack could be rotated upon the stand pipe if such were desired; the rotatable feature being just as easily accomplished in the former construction, if the frame 6 and the clip 7 loosely embraced the stand pipe and the entire structure were supported by the aforesaid collar. Extending forwardly from the portion 10 of the frame 6 is an arm 15 having a horizontal flange 16 projecting inwardly from the side thereof, and this flange is provided with a series of holes 17 through which are linked the eyes 18 of the pins 19, thereby forming a pivotal connection between the pins 19 and the arm 15. The forward end of the arm 15 is bifurcated as shown at 20, and the end of a latch bar 21 is pivoted within the bifurcation in a manner that will permit the bar to swing in a horizontal plane but which will prevent any appreciable vertical movement of the free end of the bar. The bar terminates, at its free end, in a hook 22 for a purpose which will be made clear hereinafter.

The portion 11 of the frame 6 is provided with a pair of forwardly extending, vertically disposed lugs 23 between which is pivoted a swinging arm 24. Projecting inwardly from the side of the arm 24 is a ledge 25 which is formed with a series of upwardly opening notches 26, each of which is adapted to be occupied by the free end of one of the pins 19 when the arm 24 is in a horizontal position. The forward end of the arm 24 is provided with a horizontal notch for the reception of the hooked end 22 of the bar 21. As will be seen in Fig. 6 the portion 27 of the arm 24 which is embraced by the hook 22 is, in effect, a head between which and the body portion of the bar there is a reduced neck 28. The extreme end 29 of the hook 22 extends around the portion 27 and occupies the notch 30 adjacent the neck 28. This construction prevents the parts from becoming too easily disengaged, thereby preventing the accidental withdrawal of the hook from the notch. The relative sizes of the hook and the portion embraced thereby are such as will permit of a slight inward movement of the end of the arm 24, the arm springing enough to permit of this movement during the latching or unlatching operation.

The manner of arranging the hose upon the rack is illustrated in Figs. 1 and 3, the hose being supported in successive folds upon the pins 19, the free end, or that to which the nozzle is applied, hanging over the latch bar 21 in a position to be easily grasped by the user. Assuming that the parts are in the position shown in the drawings, the operation of the rack is as follows: By giving the nozzle a pull or jerk, the hook 22 of the latch bar 21 will become disengaged from the notched end of the arm 24 permitting said arm to drop, thereby freeing the ends of the pins 19 from the notches within the ledge 25 of the arm, whereupon the hose will fall from the rack. Before returning the hose to the rack, the rack is reset by swinging all the pins into the position shown in dotted line in Fig. 4 and then lifting the arm 24 to its normal position and supporting it there by the latch bar 21, when the pins 19 may be thrown over so that their free ends will occupy the notches 26 in the ledge 25. Sections of the hose may then be passed downwardly between the successive pins 19 of the series until the entire length of the hose is accumulated upon the rack, the nozzle end projecting over and being supported by the latch bar 21.

Having thus described our invention, what we claim is:—

1. A hose rack comprising, in combination, a supporting member, an arm extending substantially horizontally from the supporting member, a series of pins pivoted to said arm, a second arm pivoted to the supporting member and capable of swinging in a vertical plane and arranged to support the free ends of said pins, said arm having a recess in its forward end, and a latch bar pivoted to the forward end of the first mentioned arm so as to swing only in a horizontal plane, the free end of said arm being adapted to occupy the recess in the forward end of the pivoted arm, to hold said arm in pin supporting position.

2. A hose rack comprising, in combination, a supporting member, an arm extending substantially horizontally from the supporting member, a series of pins pivoted to said arm, a second arm pivoted to the supporting member and capable of swinging in a vertical plane and arranged to support the free ends of said pins, said arm having a notch in its side remote from the former arm and near its forward end, one or both of said arms being yielding, and a latch bar pivoted to the forward end of the first mentioned arm and capable of movement only in a substantially horizontal plane, the latch bar having a hooked end which is adapted to extend around the forward end of the pivoted arm and occupy the recess in the side thereof and being of a length to cause the arms to be under tension when in latched position.

3. A hose rack comprising, in combination, a supporting member, an arm extending horizontally therefrom, a series of pins pivoted to said arm, a second arm pivoted to the supporting member and capable of a vertical movement and which, when in horizontal position, is adapted to support the free ends of the aforesaid pins, said arm having a notch in its side remote from the former arm and near its forward end, and a latch bar pivoted to the forward end of the first mentioned arm and which is capable of movement only in a horizontal plane and having a hooked end which is adapted to extend around the forward end of the pivoted arm and occupy the notch therein.

4. A hose rack comprising, in combination, a supporting member, an arm extending horizontally therefrom, a series of pins pivoted to said arm, a second arm pivoted to the supporting member which is capable of a vertical movement and which, when in horizontal position, is adapted to support the free ends of the aforesaid pins, said arm having a transverse notch in its forward end and a recess in the wall of the notch on the side remote from the first mentioned arm, and a latch bar pivoted to the forward end of the first mentioned arm which is capable of movement only in a horizontal plane and having a hook at its free end which is adapted to occupy the notch in the forward end of the second arm with the extreme end of the hook in the aforesaid recess.

5. A hose rack comprising a supporting member, an arm extending substantially horizontally from the supporting member, a series of pins pivoted to said arm, a second arm pivoted to the supporting member and capable of swinging in a vertical plane, and a retaining bar movably carried by one arm and normally interlocking with the other in such manner as to maintain the pivoted arm in a position to support the free ends of the aforesaid pins.

6. A hose rack comprising a supporting member, an arm extending substantially horizontally from the supporting member, a series of pins pivoted to said arm, a second arm pivoted to the supporting member and capable of swinging in a vertical plane, and a retaining bar carried by one arm and interengaging with the other in such manner as to maintain the pivoted arm in a position to support the free ends of the aforesaid pins, the last mentioned arm and said retaining bar having portions which coöperate to resist a separation of the arms in a substantially horizontal plane.

In testimony whereof, I, MORTIMER C. ROSENFELD, hereunto affix my signature in the presence of two witnesses.

MORTIMER C. ROSENFELD.

Witnesses:
 BRENNAN B. WEST,
 HUGH B. MCGILL.

In testimony whereof, I, CARL O. LUND, hereunto affix my signature in the presence of two witnesses.

CARL O. LUND.

Witnesses:
 G. KANALEY,
 I. E. KAUFMAN.

Copies of this patent may be obtained for five cents each, by addressing the "Commissioner of Patents, Washington, D. C."